April 21, 1964   S. DORNIER ETAL   3,129,907
AIRPLANE WING FLAP
Filed Aug. 11, 1961   2 Sheets-Sheet 1
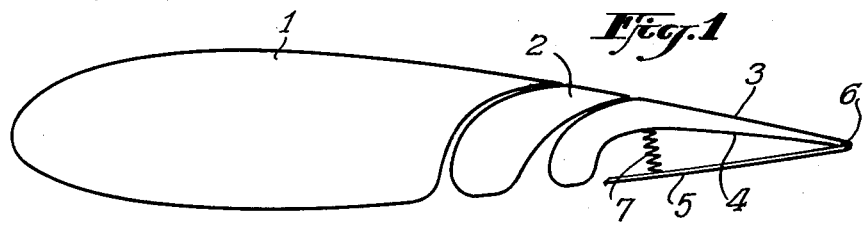
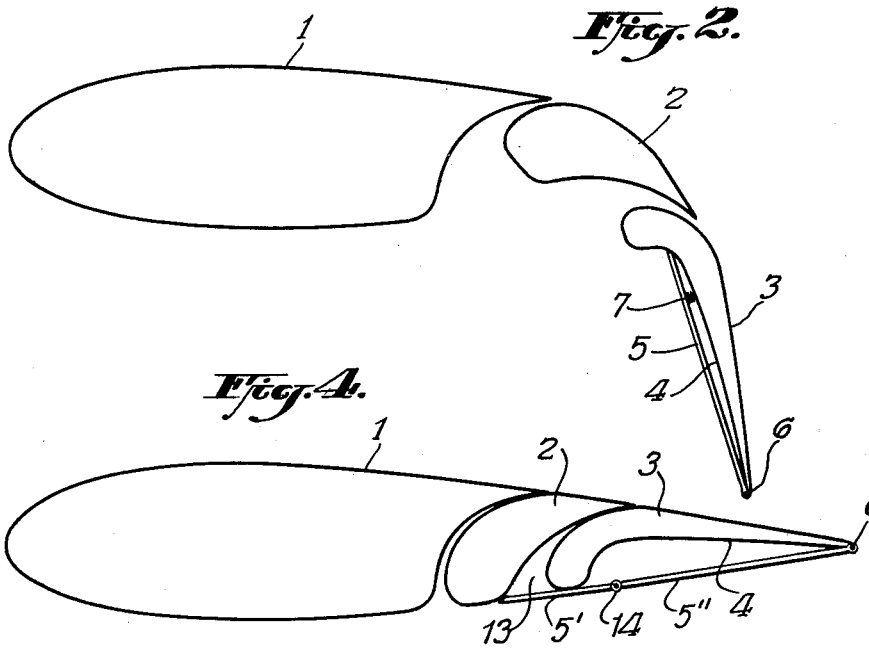
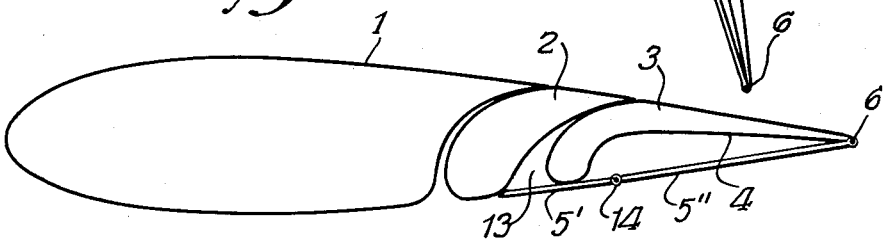
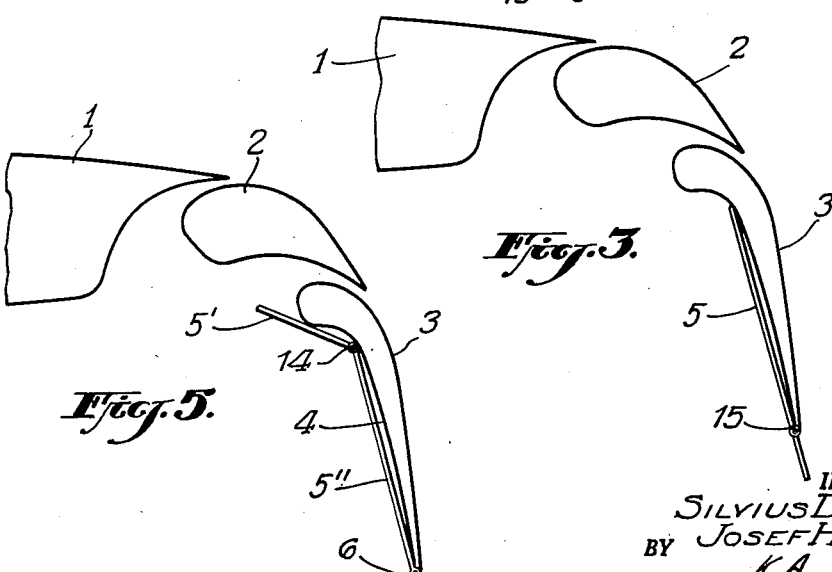
INVENTORS.
SILVIUS DORNIER.
BY JOSEF HUEBER.
K. A. Mayr
ATTORNEY.

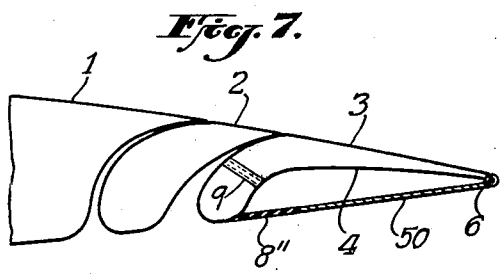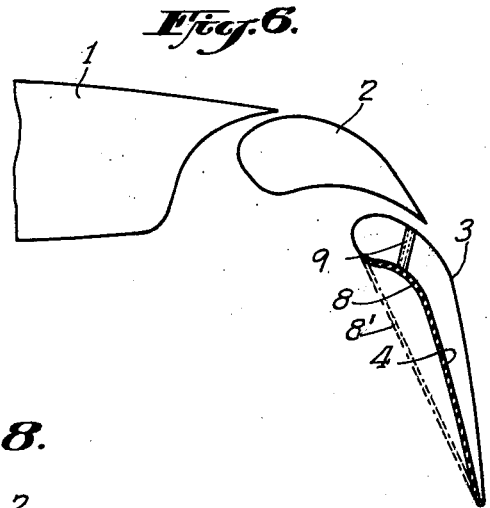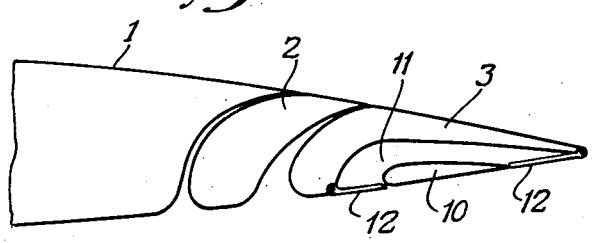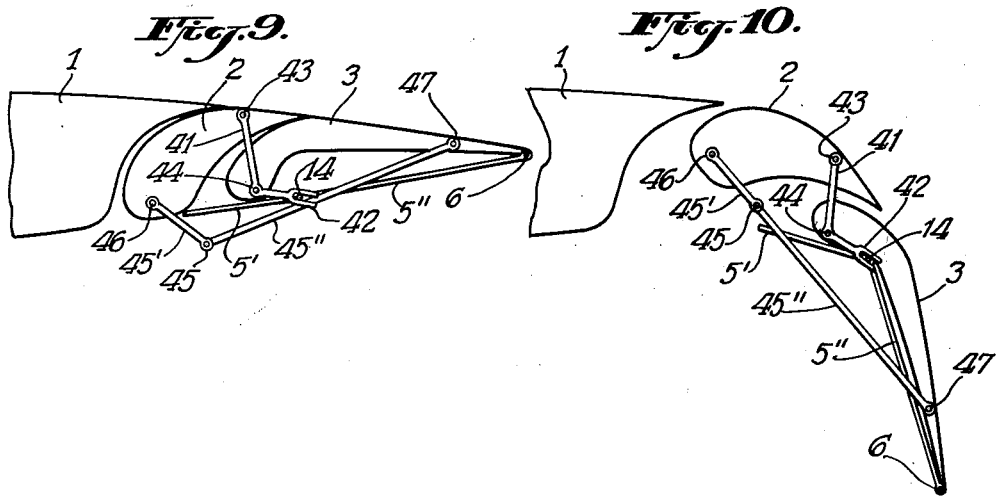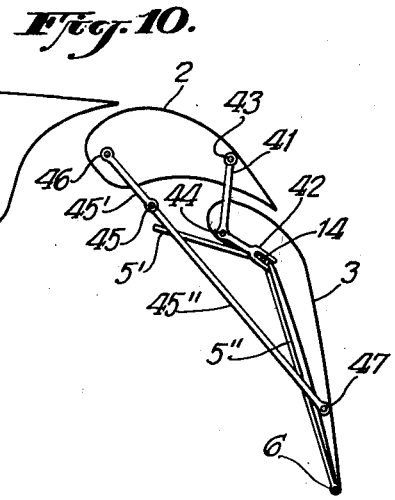

United States Patent Office 3,129,907
Patented Apr. 21, 1964

3,129,907
AIRPLANE WING FLAP
Silvius Dornier and Josef Hueber, Friedrichshafen, Germany, assignors to Dornier-Werke G.m.b.H., Friedrichshafen, Germany, a firm
Filed Aug. 11, 1961, Ser. No. 130,785
Claims priority, application Germany Aug. 18, 1960
15 Claims. (Cl. 244—42)

The present invention relates to an airplane wing having at the trailing edge a plurality of flaps arranged in series relation with respect to the flow of the air.

It is known to provide at the trailing edge of airplane wings flaps or auxiliary wings which can be protracted from and retracted into the main wing and/or which can be rocked. Landing flaps are conventional which merely change the curvature of the wing assembly for changing the lift. Auxiliary flaps are known which are not only rockable but can also be protracted and retracted to change the effective wing surface. Multiple flap arrangements are known the flaps of which can be interdependently protracted and retracted to a different extent.

The object of the present invention is to provide an improved arrangement of the last described conventional system of interdependently operated multiple flaps. The arrangement according to the invention affords deflection of the propeller slip stream for directly using the propeller thrust to produce lift.

An object of the invention is the provision of a multiple flap arrangement at the trailing edge of an airplane wing increasing not only lift but also providing high resistance for certain airplane operations, for example for landing.

The aforesaid objects are attained by providing a marked concave or vaulted surface on the underside of the outermost flap of a multiple flap system having interdependently adjustable flaps which can be protracted and retracted and/or rocked to different extents. Due to the provision of a hollowed out underside on the flap the bottom side and the top can be placed close together and almost parallel, i.e. at a very acute angle, adjacent to the trailing edge of the flap. The considerably concavely arcuated underside of the last flap considerably increases the deflection of the slip stream. With a rear flap according to the invention two flaps can produce a greater deflection of the air stream than conventional flap systems comprising three or more flaps. The arrangement according to the invention is much less expensive and much simpler and more reliable than conventional flap systems which are less effective. The extremely acute angle at which the top and bottom sides of the rear portion of the rearmost flap are placed, considerably improves the air flow conditions at the trailing edge of the rearmost flap.

Since a concave curvature of the underside of the flap would promote eddy currents during normal flight, when the flap is in retracted position, means are provided according to the invention for closing the cavity resulting from the concave formation of the underside of the flap. A resilient plate member may have a marginal portion connected to the rear edge of the flap and held in the desired position by the resiliency of the plate member. As a modification a plate may be hinged to the rear edge of the flap and may be held in the desired position by a spring. When the plane is in normal flight the spring presses the plate against an abutment whereby the plate is in the chordal plane of the concave curvature and closes the cavity. When the flap is protracted the impact pressure of the air presses the plate into the cavity and against the undersurface of the flap so that the desired increased downward deflection of the air stream due to the configuration of the flap is fully obtained.

In a further embodiment of the invention an elastic sheet-like member, for example a rubber sheet, may be connected to the underside of the flap and held tautly in the chordal plane of the curvature when the flap is retracted and the plane is in normal flight. When the flap is protracted, i.e. swung downward, the impact pressure of the air expands the elastic sheet and presses it against the concavely curved underside of the flap. The sheet-like member may be composed of a rigid or inelastic part, for example woven material, and an elastic part.

The novel features which are considered characteristic of the invention are set forth with particularly in the appended claims. The invention itself, however, and additional objects and advantages thereof will best be understood from the following description of embodiments thereof when read in connection with the accompanying drawing, wherein:

FIG. 1 is a diagrammatic cross sectional illustration of an airplane wing according to the invention with the flaps in retracted position.

FIG. 2 is a cross sectional illustration of the airplane wing shown in FIG. 1 with the flaps in extended position.

FIG. 3 is a diagrammatic illustration of the rear portion of a modification of a flap arrangement according to the invention.

FIG. 4 is a cross sectional view of a modified flap arrangement according to the invention in retracted position.

FIG. 5 is a diagrammatic cross sectional illustration of the rear portion of the wing shown in FIG. 4 with the flaps in extended position.

FIG. 6 is a cross sectional view of the rear portion of another modification of an airplane wing according to the invention with the flaps in protracted position.

FIG. 7 illustrates a variant of the modification shown in FIG. 6 with the flaps in retracted position.

FIG. 8 is a cross sectional view of the rear portion of still another modification of an airplane wing according to the invention.

FIG. 9 is a diagrammatic illustration of the rear portion of an airplane wing as shown in FIG. 4 in retracted position and provided with a kinematic linkage for interdependent actuation of the flaps.

FIG. 10 shows the arrangement according to FIG. 9 in protracted position.

Referring more particularly to FIG. 1 of the drawing, numeral 1 designates an airplane wing at the trailing edge of which flaps 2 and 3 are provided which are shown in retracted position in FIG. 1. The underside of the rearmost flap 3 has a very pronounced concave curvature or cavity 4. This cavity is closed by a plate 5 which is movably, for example swingably, connected to the rear edge 6 of the flap 3. A spring 7 presses the plate 5 outward against an abutment, not shown, for entirely closing the cavity 4.

FIG. 2 shows the flap arrangement illustrated in FIG. 1 in extended or protracted position. The plate 5 is pressed into the cavity 4 against the action of the spring 7. In this position of the plate substantially the entire cavity is available for deflecting the propeller slip stream and a considerable deflection can be obtained. The plate 5 may be moved in various ways. A mechanical linkage may be provided for swinging the plate 5 around the fulcrum 6 at the trailing edge of the flap 3 in response to the movement of the flaps 2 and 3. The spring 7 is so designed that the impact pressure of the air stream moves the plate 5 entirely into the cavity 4 when the flap 3 is protracted. If desired, the elastic force of the spring 7 may be adjusted by a suitable linkage to correspond to the extent of movement of the flap 3.

In order to fit the spring loaded plate 5 snuggly into the cavity of the protracted flap the plate may be made elastic, flexible or foldable.

Another way to fit the plate 5 closely into the cavity 4 is shown in FIG. 3. In this case the plate 5 is slidably mounted on a hinge 15 provided on the trailing edge of the flap 3. In this way the plate 5 does not only swing on the trailing edge of the flap 3 but also moves somewhat to the rear upon protraction of the flaps 2 and 3 whereby a portion of the plate extends beyond the trailing edge of the flap 3, increasing the effective length of the flap.

Another modification of the plate covering the cavity at the underside of the rearmost flap 3 when the plane is in normal flight is shown in FIGS. 4 and 5. In this modification the plate is wider than in the modification shown in FIGS. 1 and 2 and has a portion 5' extending forward beyond the forward edge of the flap 3 and covering a slot 13 between the flaps 3 and 4 when the airplane is in normal flight, i.e., when the flaps 2 and 3 are in retracted position. If desired, the forward part of the flap can be so great as to cover several slots or clearances of flaps at the rear edge of the wing 1. The plate shown in FIGS. 4 and 5 is foldable and comprises two parts 5' and 5" connected by a hinge 14. When the flaps are in protracted or extended position shown in FIG. 5 the plate is folded at the hinge 14 and the later is moved into the cavity 4 and into abutment with the lower surface of the flap 3.

FIG. 6 shows another arrangement according to the invention in extended position. In this modification the cavity 4 at the underside of the rearmost flap 3 is covered by an elastic sheet-like element, for example a rubber sheet. When the flap 3 is in retracted position the rubber sheet is in the chordal plane of the curvature of the undersurface of the flap 3 as shown by a dotted line 8' in FIG. 6. When the flap 3 is protracted the impact pressure of the air expands and presses the rubber sheet into the position shown by a solid line 8 where it is in snug contact with the concave underside of the flap 3. Venting channels 9 may be provided in the flap 3 and connecting the cavity 4 to the outside and affording escape of the air when the rubber sheet is pressed against the concave wall of the flap 3 and permitting entrance of air when the rubber sheet forms a chordal plane. By this arrangement the impact pressure of the air is assisted by the suction pressure at the top side of the flap 3. To obtain this effect the vents 9 interconnect the topside and the underside of the flap 3 at such a location that the vents are closed when the flaps are in retracted position or there is a slight pressure at the upper side of the flap 3 so that the rubber sheet can assume the position shown by the dotted lines 8' when the flaps are retracted and the airplane is in normal flight. A similar effect can be obtained by an arrangement as shown in FIG. 7. Here a plate 50 is hinged to the rear edge of the flap 3 and an elastic sheet, for example, a rubber sheet 8" is connected to the forward edge of the flap 3 and to the forward edge of the plate 50. The latter is substantially plane and adapted to rest on a substantially plane portion of the concavely curved underside of the flap 3 whereas the elastic portion adapts itself to the arcuated forward wall portion of the cavity 4 when the flaps are in protracted position. In lieu of the plate 50 inelastic, flexible material, for example woven fabric, may be used. In this case the inelastic material may form the forward part of the sheet-like element and the elastic material may form the rear part of the sheet-like element.

A further modification of the system according to the invention is shown in FIG. 8. A rigid guide element 10 is placed in the cavity of the flap 3 forming a channel 11 between the flap 3 and the guide element 10 which has the same effect as the cavity shown in FIGS. 1 to 7, when the flap is in protracted position. When, during normal flight the flap is retracted the channel 11 may be closed for example by means of flaps 12 arranged at the ends of the channel 11 and hinged to the flap 3 and automatically pressed by the impact pressure of the air, if desired against the action of springs, to open the channel 11 when the flaps 2 and 3 are protracted.

FIGS. 9 and 10 illustrate a kinematic linkage interconnecting the plate elements 5' and 5" shown in FIGS. 4 and 5 and the flaps for interdependent movement of the plate elements and the flaps 2 and 3. The latter are connected by a knee or toggle joint 45 having a lever 45' pivoted at 46 to the flap 2 and a lever 45" pivoted at 47 to the flap 3. The flaps 2 and 3 are also connected by an angular lever 41 which is pivoted at 43 to the flap 2 and at 44 to the flap 3. The arm of the lever 41 extending from the pivot 44 is provided with a fork 42 straddling a bolt at the hinge 14 interconnecting the plate elements 5' and 5". For protracting the flaps the knee or toggle joint 45 is extended by conventional means not shown and not forming part of the invention. The fork 42 simultaneously presses the hinge 14 into the cavity 4 whereby the plate elements are placed in the positions shown in FIGS. 5 and 10. The flaps 2 and 3 and the elements 5', 5" are maintained in the position shown in FIG. 10 by the extended toggle joint formed by the elements 45', 45, 45" and are maintained in the position shown in FIG. 9 by the extended toggle joint formed by the elements 41, 14, 5".

All described and illustrated modifications of the invention produce a deflection of the air stream resulting in increased lift and increased resistance and the angle formed by the upper and lower sides at the rear edge of the rearmost flap is very small, which produces extremely favorable flow conditions.

We claim:

1. An airplane wing comprising:
   a main portion having a trailing edge,
   a protractable first flap adjacent to and behind said trailing edge,
   a protractable second flap placed behind and adjacent to the first flap, when the flaps are in retracted position and when they are in protracted position,
   said flaps being operatively interconnected for interdependent protraction and retraction,
   said second flap having a vaulted bottom surface and the bottom surfaces of said flaps forming a continuously flexed rear portion of the bottom surface of the wing for deflecting the propeller slip stream for directly using the propeller thrust to produce lift when said flaps are in protracted position,
   the top side of the rearmost flap being close to the bottom side of the rearmost flap, and
   said top side and said bottom side being placed at a very acute angle adjacent to the rear edge of said rearmost flap.

2. An airplane wing comprising:
   a plurality of protractable flaps placed in series relation with respect to the flow of air at the trailing edge of the wing and being operatively interconnected for interdependent protraction and retraction,
   the underside of the rearmost of said flaps being concavely curved and forming a cavity, and
   means mounted on the underside of said rearmost flap and constructed and arranged so as to close said cavity when said rearmost flap is in retracted position and to move into said cavity and rest adjacent to said concavely curved underside when said rearmost flap is in protracted position.

3. An airplane wing as defined in claim 2 wherein said means mounted on the underside of said rearmost flap comprises substantially plane plate means, means connecting said plate means to the rear edge of said rearmost flap, said connecting means being constructed and arranged so as to afford swinging of said plate means around an axis parallel to the longitudinal axis of said flaps for closing said cavity when said rearmost flap is in retracted position, and to afford movement of said plate means in a direction normal to the swing axis of said plate means for permitting swinging of said plate means into said cavity and adjacent to said concavely curved underside and for simultaneously protracting said plate means rearwardly beyond the rear edge of said rearmost flap when the latter is in protracted position.

4. An airplane wing as defined in claim 2 wherein said means mounted on the underside of said rearmost flap comprises a guide element placed in said cavity and having an inner surface spaced from, substantially parallel to and facing said concavely curved underside and forming a channel adjacent to said concave underside, said guide element having an outer surface placed substantially in the chordal plane of the concave curvature of the underside of the flap.

5. An airplane wing as defined in claim 4 and comprising movable closure means connected to said rearmost flap and being constructed and arranged to be flush with the outer surface of said guide element and to close said channel when said rearmost flap is in retracted position and to move adjacent to the concavely curved underside of the rearmost flap when the latter is in protracted position.

6. An airplane wing as defined in claim 2 wherein said means mounted on the underside of said rearmost flap comprises a sheetlike element having at least a portion which is elastic, said sheetlike element being in the chordal plane of the concavely curved underside of said flap and closing said cavity when said rearmost flap is in retracted position and being moved into said cavity and adjacent to said concavely curved underside by the impact pressure of the air when said rearmost flap is in protracted position.

7. An airplane wing as defined in claim 6 including venting channels in said rearmost flap connecting the underside and the topside of the flap for connecting said cavity for air flow with the outside.

8. An airplane wing as defined in claim 6, and wherein said sheet-like element has a plate-like rear portion swingably connected to said rearmost flap substantially at the rear edge thereof and has an elastic forward portion connected to the forward edge of said rearmost flap.

9. An airplane wing as defined in claim 6, and wherein said sheet-like element has a flexible, inelastic portion connected to said rearmost flap and has an elastic portion connected to said inelastic portion and to said rearmost flap.

10. An airplane wing according to claim 2 and wherein said means mounted on said rearmost flap is movably connected to said rearmost flap substantially at the rear edge thereof.

11. An airplane wing according to claim 10, including a kinematic linkage interconnecting said means mounted on said rearmost flap and said flaps for interdependent movement of said means and of said flaps.

12. An airplane wing according to claim 11 wherein said means mounted on said rearmost flap comprises an element swingably connected to said rearmost flap, and said linkage comprises a lever having one end pivotally connected to one of said flaps, a lever having one end pivotally connected to the second flap, the second ends of said levers being pivotally connected and said levers forming a toggle joint which is in extended position when the flaps are protracted and which is in collapsed position when the flaps are retracted, and an angle lever having one end pivotally connected to the flap which is ahead of said rearmost flap, the bend of said angle lever being pivotally connected to said rearmost flap, said angle lever having a free end swingably connected to said element which is swingably connected to said rearmost flap and forming a toggle joint with said element which toggle joint is in extended position when the flaps are retracted and which is in collapsed position when said flaps are protracted.

13. An airplane wing according to claim 2 and wherein said means mounted on said rearmost flap is swingably connected to said rearmost flap substantially at the rear edge thereof, a spring being interposed between said means and said rearmost flap for maintaining said means in cavity closing position when said rearmost flap is in retracted position, said spring permitting pressing of said means into said cavity against the action of the spring by the impact pressure of the air when said rearmost flap is in protracted position.

14. An airplane wing comprising a main portion having a trailing edge, a protractable first flap adjacent to and behind said trailing edge, a protractable second flap placed behind and adjacent to said first flap, when said flaps are in retracted position and when they are in protracted position, said flaps being operatively interconnected for interdependent protraction and retraction, said flaps being so constructed and arranged as to form a continuously flexed rear portion of the wing for deflecting the propeller slip stream for directly using the propeller thrust to produce lift when said flaps are in protracted position, and to form an extended rear portion of the wing when the flaps are in retracted position, the underside of the rearmost of said flaps being concavely curved, the topside of the rearmost flap being close to the bottom side of said rearmost flap, both sides being placed at a very acute angle adjacent to the rear edge of said rearmost flap, said concave underside forming a cavity, plate means comprising at least two plate elements, and hinge means swingably interconnecting said plate elements to swing around an axis substantially parallel to the longitudinal extension of said flaps, the plate element extending rearward of said hinge means having a rear edge swingably connected to the rear edge of said rearmost flap, said two plate elements being substantially coplanar and closing said cavity when said flap is in retracted position and being at an angle with respect to each other and being within said cavity and said hinge means being adjacent to said concavely curved underside when said flap is in protracted position.

15. An airplane wing as defined in claim 14 and wherein there is a slot between said rearmost flap and the flap next thereto, the plate element extending forward of said hinge means closing also said slot when said flaps are in retracted position.

References Cited in the file of this patent

UNITED STATES PATENTS

| | | |
|---|---|---|
| 2,137,879 | Ksoll | Nov. 22, 1938 |
| 2,207,453 | Blume | July 9, 1940 |
| 2,276,522 | Staufer | Mar. 17, 1942 |
| 2,346,326 | Peed | Apr. 11, 1944 |

FOREIGN PATENTS

| | | |
|---|---|---|
| 521,247 | Germany | Mar. 27, 1931 |
| 715,266 | Germany | Dec. 18, 1941 |
| 846,421 | France | June 5, 1939 |